(12) United States Patent
Jastrzembowski et al.

(10) Patent No.: US 7,219,569 B2
(45) Date of Patent: May 22, 2007

(54) INTEGRAL ONE-WAY OVERRUN CLUTCH WITH EPCICYCLE GEAR SYSTEM

(75) Inventors: Marty Jastrzembowski, Brighton, MI (US); Wei Xue, Northville, MI (US); Ravi Atluru, Westland, MI (US); George W. Lewis, Chicago, IL (US); Eric Sean Twigg, Ypsilanti, MI (US); Bruce Thayer, Belleville, MI (US)

(73) Assignee: Automotive Components Holdings, LLC, Dearborn, MN (US)

( * ) Notice: Subject to any disclaimer, the term of this patent is extended or adjusted under 35 U.S.C. 154(b) by 539 days.

(21) Appl. No.: 10/727,066

(22) Filed: Dec. 3, 2003

(65) Prior Publication Data

US 2005/0120814 A1    Jun. 9, 2005

(51) Int. Cl.
*F02N 1/00*    (2006.01)
(52) U.S. Cl. .......................................... 74/7 R; 74/7 E
(58) Field of Classification Search .................. 74/7, 74/7 R, 7 C, 7 E; 192/3.52, 42
See application file for complete search history.

(56) References Cited

U.S. PATENT DOCUMENTS

| | | | | |
|---|---|---|---|---|
| 4,800,766 A | | 1/1989 | Isozumi et al. ................ 74/7 E |
| 4,947,052 A | | 8/1990 | Isozumi ........................ 290/48 |
| 4,987,786 A | | 1/1991 | Morishita et al. .............. 74/7 C |
| 5,023,466 A | | 6/1991 | Isozumi ........................ 290/48 |
| 5,036,213 A | | 7/1991 | Isozumi ........................ 290/48 |
| 5,067,357 A | | 11/1991 | Isozumi ........................ 74/7 E |
| 5,086,658 A | | 2/1992 | Isozumi ........................ 74/7 E |
| 5,154,090 A | | 10/1992 | Konishi ........................ 74/7 E |
| 5,199,309 A | * | 4/1993 | Isozumi ........................ 74/7 E |
| 5,528,945 A | * | 6/1996 | Okada .......................... 74/7 A |
| 5,549,011 A | * | 8/1996 | Shiga et al. ................... 74/7 E |
| 5,848,551 A | | 12/1998 | Ohmi et al. ................... 74/7 C |
| 6,269,706 B1 | * | 8/2001 | Kuragaki et al. .............. 74/7 A |
| 6,286,378 B1 | * | 9/2001 | Kamei et al. .................. 74/7 A |

* cited by examiner

*Primary Examiner*—David M. Fenstermacher

(57) ABSTRACT

A starter motor for an internal combustion engine having an integral one-way roller clutch and epicycle gear train unit is provided. The integrated unit includes an integrated gear support/clutch barrel which, on one side, houses the roller and spring elements of the clutch and, on the other side, supports the planetary gears of the epicycle gear assembly. The invention is of simple construction and provides reduced overall starter motor dimension while demonstrating improved noise, vibration and harshness characteristics.

20 Claims, 4 Drawing Sheets

INTEGRAL ONE-WAY OVERRUN CLUTCH WITH EPCICYCLE GEAR SYSTEM

BACKGROUND OF THE INVENTION

The present invention relates to starter motors used to crank internal combustion engines. More particularly, the present invention relates to a starter motor which integrates the epicycle gear train and the one-way roller clutch into an axially compact unit.

Internal combustion engines conventionally use electric starter motors for cranking. Electric starter motors became popular in the late 1900's and early 1910's and incorporated a one-way clutch fitted to the end of the armature shaft of the starter. The one-way clutch is used during engine cranking to transmit torque and motion from the electrical motor to the output shaft and pinion and to the ring gear on the engine crankshaft. By only operating in a single direction, the clutch prevents the electric motor from being rotated too fast when driven by the engine after it has been successfully started. Typically the one-way clutch is in the form of a roller clutch that provides extra protection when a large load is transmitted from the engine to the starter by any means. The motor armature shaft is connected directly with the output shaft via the one-way clutch.

As engine size and cylinder compression increased with advances in engine technology, an epicycle or planetary gear train was added to the starter motor arrangement to increase torque. According to known design, the epicycle gear train is separate from the one-way roller clutch assembly. By having two separate assemblies the overall length of the starter is inherently long, thus creating engine compartment packaging problems. In addition, the greater length of the starter, which is a direct result of the arrangement of the two separate assemblies, results in vibration and fatigue failures.

SUMMARY OF THE INVENTION

The present invention provides an integral one-way roller clutch and epicycle gear train unit that overcomes the problems and limitations of known starter motors. Briefly, the integrated unit includes an integrated gear support/clutch barrel which, on one side, houses the roller and spring elements of the clutch and, on the other side, supports the planetary gears of the epicycle gear assembly.

This configuration offers several advantages over known starter motors. The integrated unit of the present invention provides for a shorter starter motor size, thus allowing for a superior packaging arrangement in the engine compartment. The present invention also is simpler than known starter motors in that it has fewer parts, thus saving material cost and reducing the tolerance stack-up from the normal variation of parts. In addition, the starter motor of the present invention demonstrates improved noise, vibration and harshness characteristics.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The following description of the preferred embodiment of the present invention provides an example of the present invention. The embodiment discussed herein is merely exemplary in nature and is not intended to limit the scope of the invention in any manner. Rather, the description of the preferred embodiment serves to enable a person of ordinary skill in the relevant art to make and use the present invention.

Figure 1:
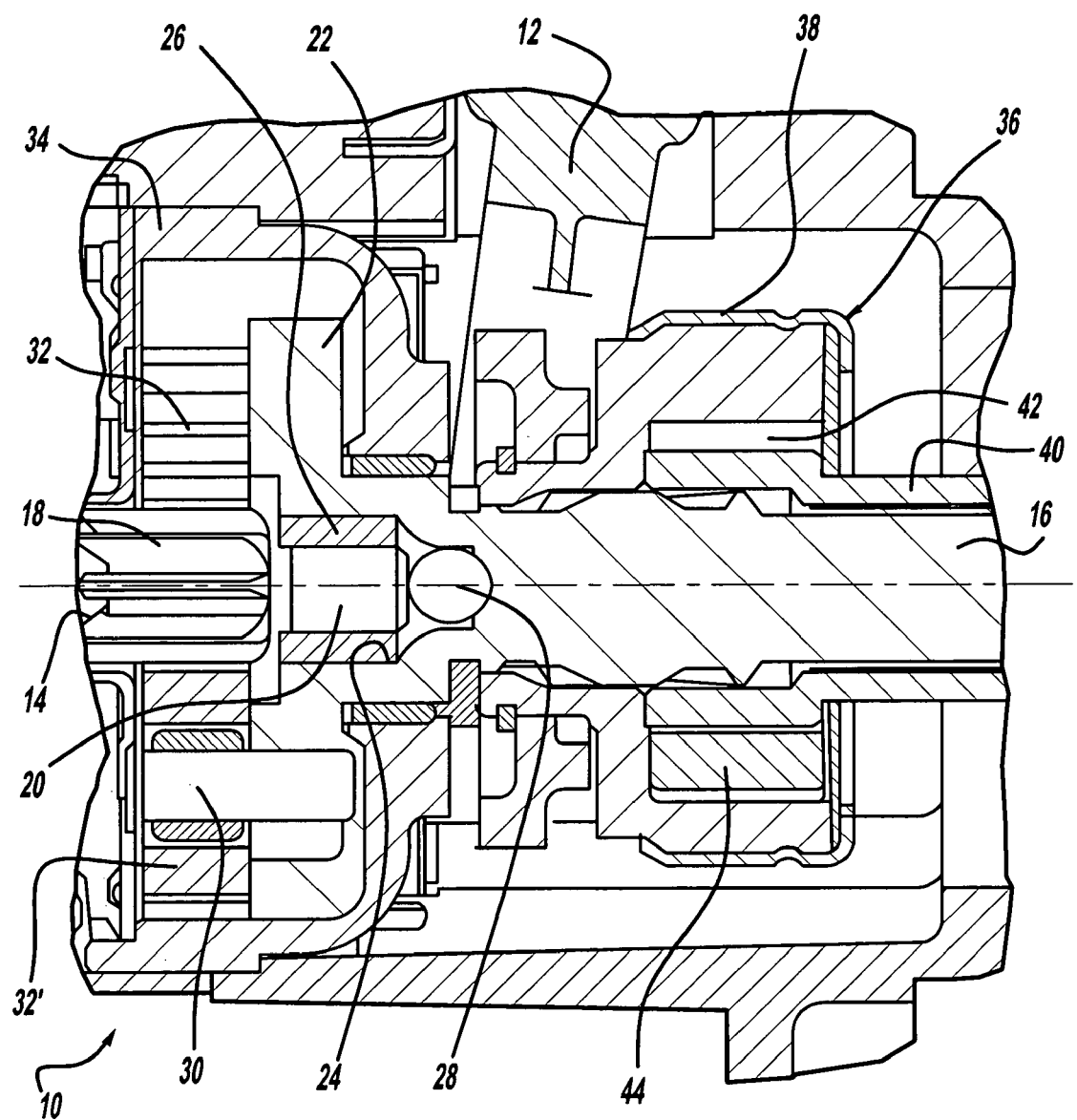
FIG. 1 is a longitudinal sectional view of a portion of a starter motor illustrating the epicycle gear train and the one-way roller clutch as being two separate assemblies as is known in the art.

FIG. 1 illustrates a longitudinal sectional view of a portion of a known starter motor, generally illustrated as 10. The starter motor 10 illustrates the epicycle gear train and the one-way roller clutch as being two separate assemblies as is known in the art. The starter motor 10 includes a motor housing 12 having a known configuration. Internally the starter motor 10 includes an armature shaft, the end of which is shown as shaft drive end 14, and an output shaft 16. The drive end 14 has a sun gear 18 formed thereon. The drive end 14 terminates at a bearing surface 20.

The output shaft 16 includes an end 22. Defined within the end 22 of the output shaft 16 is a bearing pocket 24. A sleeve bearing 26 is disposed within the bearing pocket 24. A thrust ball 28 is also fitted within the pocket 24. The bearing journal surface 20 is rotatably mounted within the sleeve bearing 26.

A plurality of planetary gear shafts are fitted to the end 22 of the output shaft 16, of which a single planetary gear shaft 30 is illustrated according to the sectional view of FIG. 1. A like plurality of planetary gears are rotatably mounted on the planetary gear shafts, of which planetary gears 32, 32' are illustrated with the planetary gear 32' being fitted to the planetary gear shaft 30. The planetary gears are operatively mounted within a stationary gear 34 which is fixedly mounted within the starter motor housing 12. The operation of the sun, planetary, and stationary gears is known in the art.

A one-way clutch assembly, generally illustrated as 36, is illustrated relative to the epicycle gear train. The one-way clutch assembly 36 includes a clutch barrel 38 and a carrier shaft 40. A clutch roller cavity 42 is defined between the inner wall of the clutch barrel 38 and the outer wall of the carrier shaft 40. Within the clutch roller cavity 42 are disposed a plurality of clutch rollers, of which one, clutch roller 44, is illustrated, and a like plurality of springs (not illustrated). The rollers are movable between a slipping position and a working position depending on the relative rotational speeds of the clutch barrel 38 and the carrier shaft 40 as is known in the art. The biasing action of the springs acts to maneuver the rollers to their locked (working) positions, as is also known in the art.

As may be seen by reference to FIG. 1, the epicycle gear train and the one-way clutch assembly are spaced apart according to known configurations. The present invention, described hereinafter and illustrated in FIGS. 2 through 4, overcomes the disadvantages of this traditional arrangement by providing an integrated epicycle gear train/one-way clutch assembly.

Figure 2:
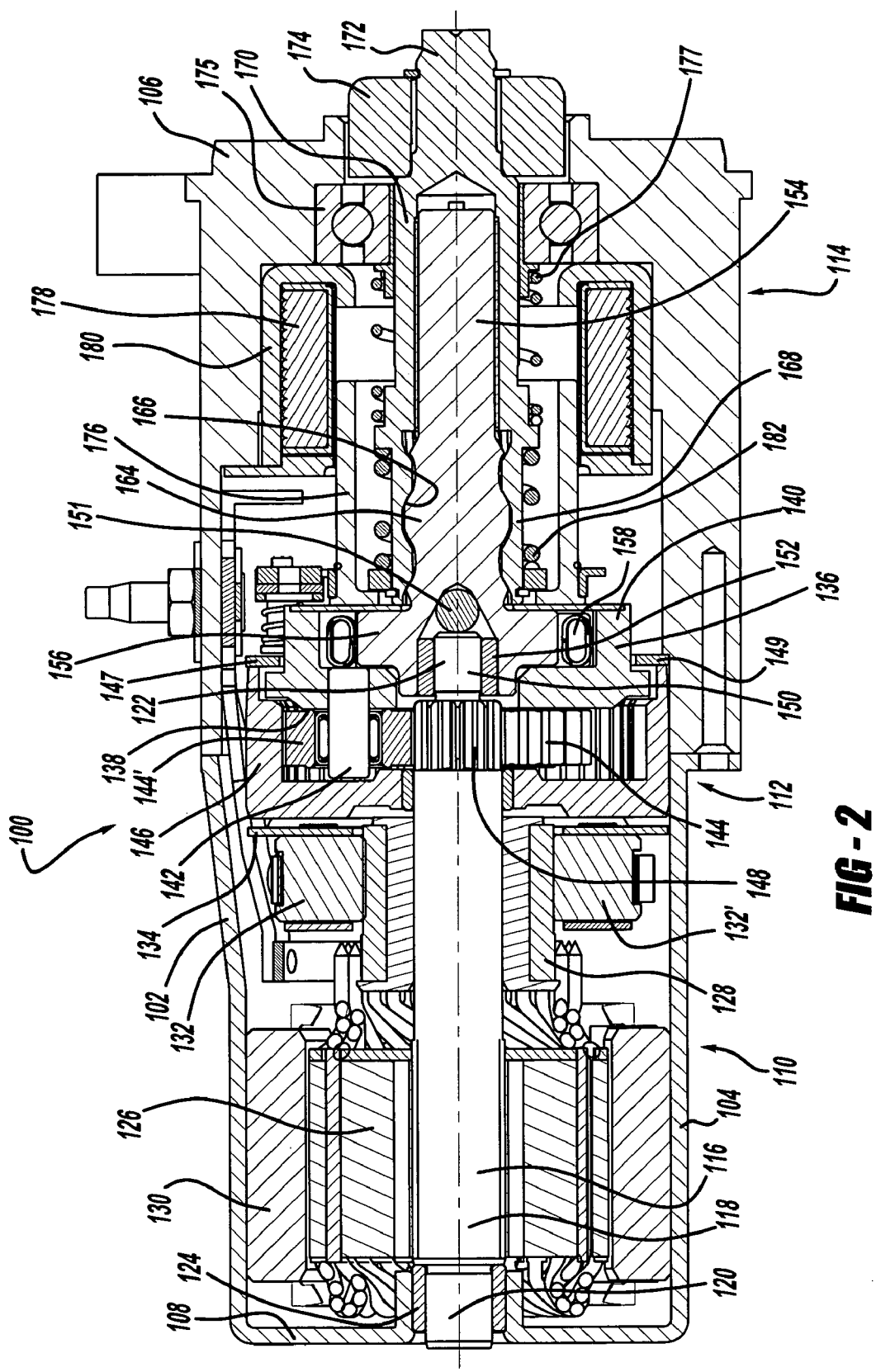
FIG. 2 is a longitudinal sectional view of the starter motor of the present invention illustrated in the disengaged position.

FIG. 2 is a longitudinal sectional view of a starter motor, generally illustrated as 100, according to the present invention. The starter motor 100 is shown in its disengaged position in this figure.

The starter motor 100 includes a housing 102. The housing 102 is comprised of a motor cover 104 removably attached to a starter housing 106. The motor cover 104 includes a closed end 108. Internally, the starter motor 100 includes a motor portion, generally illustrated as 110, an epicycle gear train/one-way roller clutch assembly, generally illustrated as 112, and a solenoid assembly, generally illustrated as 114.

The motor portion 110 includes an armature 116 having an armature shaft 118 which itself includes a first end 120 and a second end 122. The first end 120 of the armature shaft 118 is rotatably mounted within a sleeve bearing 124 that is mounted in the closed end 108 of the motor cover 104. The motor portion 110 further includes armature windings 126 and a commutator 128 formed on the armature shaft 118 as is known in the art. The motor portion 110 also includes a plurality of magnets 130 fixed to the inner wall of the motor cover 104 and brush assemblies 132, 132' mounted to a support plate 134. The support plate 134 is fixedly mounted to the inner wall of the motor cover 104.

The second end 122 of the armature shaft 118 terminates in and is thus part of the epicycle gear train/one-way roller clutch assembly 112. The assembly 112 includes an integrated gear support/clutch barrel 136 having a gear side 138 and a clutch side 140. A plurality of planetary gear shafts are fitted to the gear side 138 of the integrated gear support/clutch barrel 136, of which a single planetary gear shaft 142 is illustrated according to the sectional view of FIG. 2. Similarly, FIG. 3, which shows an exploded perspective view of the operative epicycle gear train/one-way roller clutch assembly 112 including the integrated gear support/clutch barrel 136, illustrates additional planetary gear shafts 142', 142".

Figure 3:
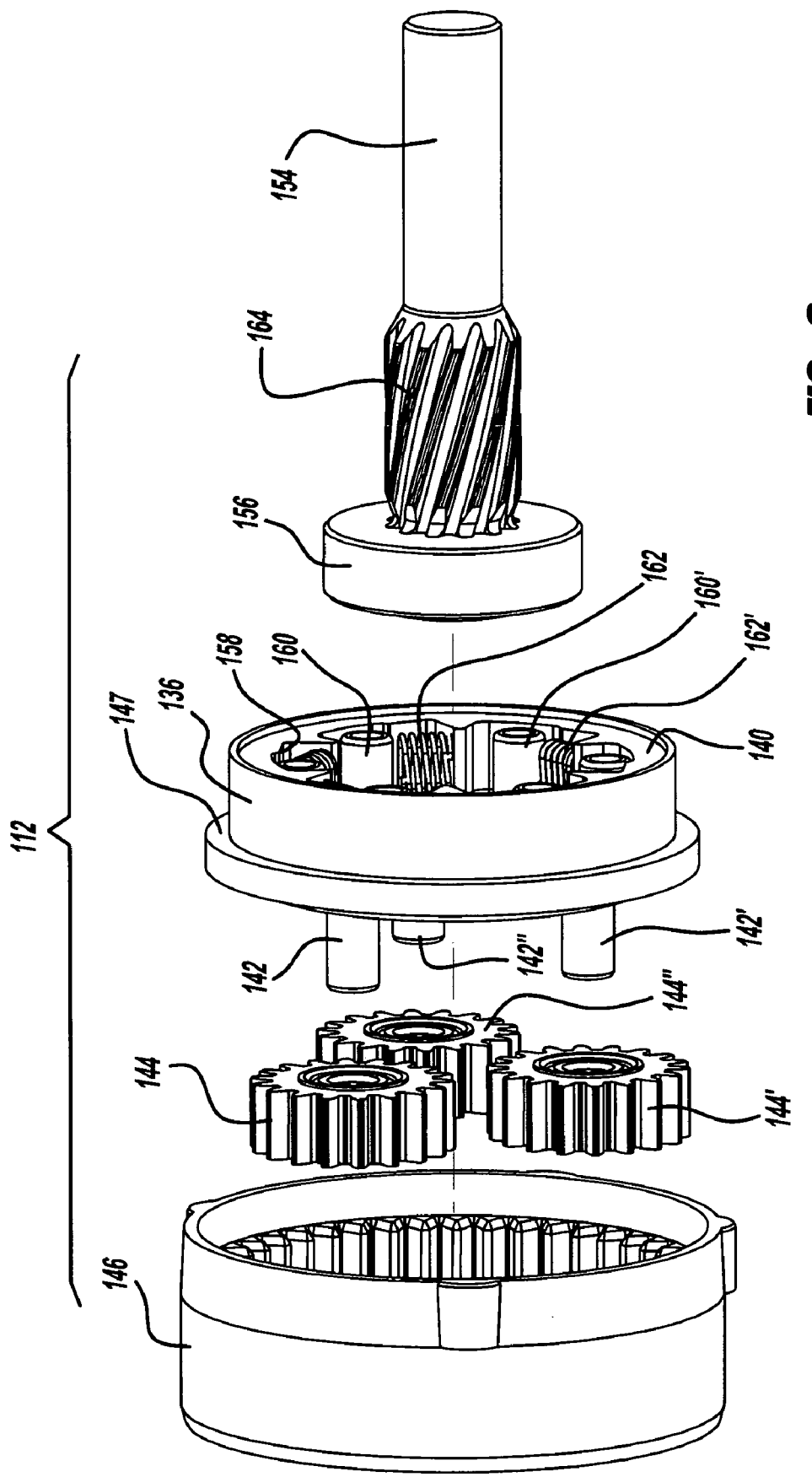
FIG. 3 is an exploded perspective view of certain elements of the starter motor illustrated in FIG. 2 which illustrates the relationship of the integral epicycle gear train and one-way roller clutch.

A like plurality of planetary gears are rotatably mounted on the planetary gear shafts, of which planetary gears 144, 144' are illustrated in FIG. 2 with the planetary gear 144' being fitted to the planetary gear shaft 142. The planetary gears 144, 144' are also seen in FIG. 3, which shows an additional planetary gear 144". The planetary gears are operatively mounted within a stationary gear 146 which is fixedly mounted within the starter motor housing 102. The integrated gear support/clutch barrel 136 is operatively mated to the stationary gear 146 by a support ring 147. The support ring 147 is fixedly attached to the stationary gear 146. A support wall 149 is partially defined in the starter housing 106 against which the support ring 147 partially rests. The clutch barrel 136 is freely rotatable within the support ring 147.

The second end 122 of the armature shaft includes a sun gear 148 and a bearing surface 150 that is rotatably mounted within a sleeve bearing 152 that is fixedly and centrally mounted within an aperture defined in the end of the integrated gear support/clutch barrel 136. A thrust ball 151 is also fitted within the aperture defined in the end of the integrated gear support/clutch barrel 136. The operation of the sun, planetary, and stationary gears is consistent with known operation.

The epicycle gear train/one-way roller clutch assembly 112 further includes an output shaft 154. The output shaft 154 includes a race 156. A clutch roller housing 158 is defined between the inner wall of the clutch barrel 136 and the race 156. Within the clutch roller housing 158 is disposed a plurality of clutch rollers, of which two clutch rollers 160, 160' are shown in FIG. 3. A like number of springs are provided for biasing the clutch rollers into their locked or working positions as is known in the art. Some of the springs are shown generally in FIG. 2, while a pair of springs 162, 162' are more clearly seen in FIG. 3.

The output shaft 154, which is also part of the clutch assembly 112, includes a series of parallel external helical splines 164 which are cut into the shaft 154. The helical splines 164 are seen sectionally in FIG. 2 and perspectively in FIG. 3. The helical splines 164 mesh with a like number of internal helical splines 166 formed in the inner wall of an input end 168 of a carrier shaft 170, shown sectionally in FIG. 2. The carrier shaft 170 also includes an output end 172 which is mated via splines to a pinion gear 174 which is selectively matable with the ring gear of the internal combustion engine crankshaft (not shown) as will be described below. The output end 172 of the carrier shaft 170 is rotatably mounted within the clutch housing 106 by a bearing assembly 175.

The solenoid assembly 114 is of the open frame or "D" frame configuration. The assembly 114 includes a solenoid plunger 176 which selectively reciprocates with and lends support to the carrier shaft 170 in a known manner. A solenoid coil and bobbin assembly 178 is mounted in a coil frame 180. The frame 180 is fixedly mounted within the starter housing 106.

The solenoid assembly 114 is shown in FIG. 2 in its open position wherein the motor 100 is disengaged and is in its resting configuration. In this position no power is directed to the motor 100.

Figure 4:
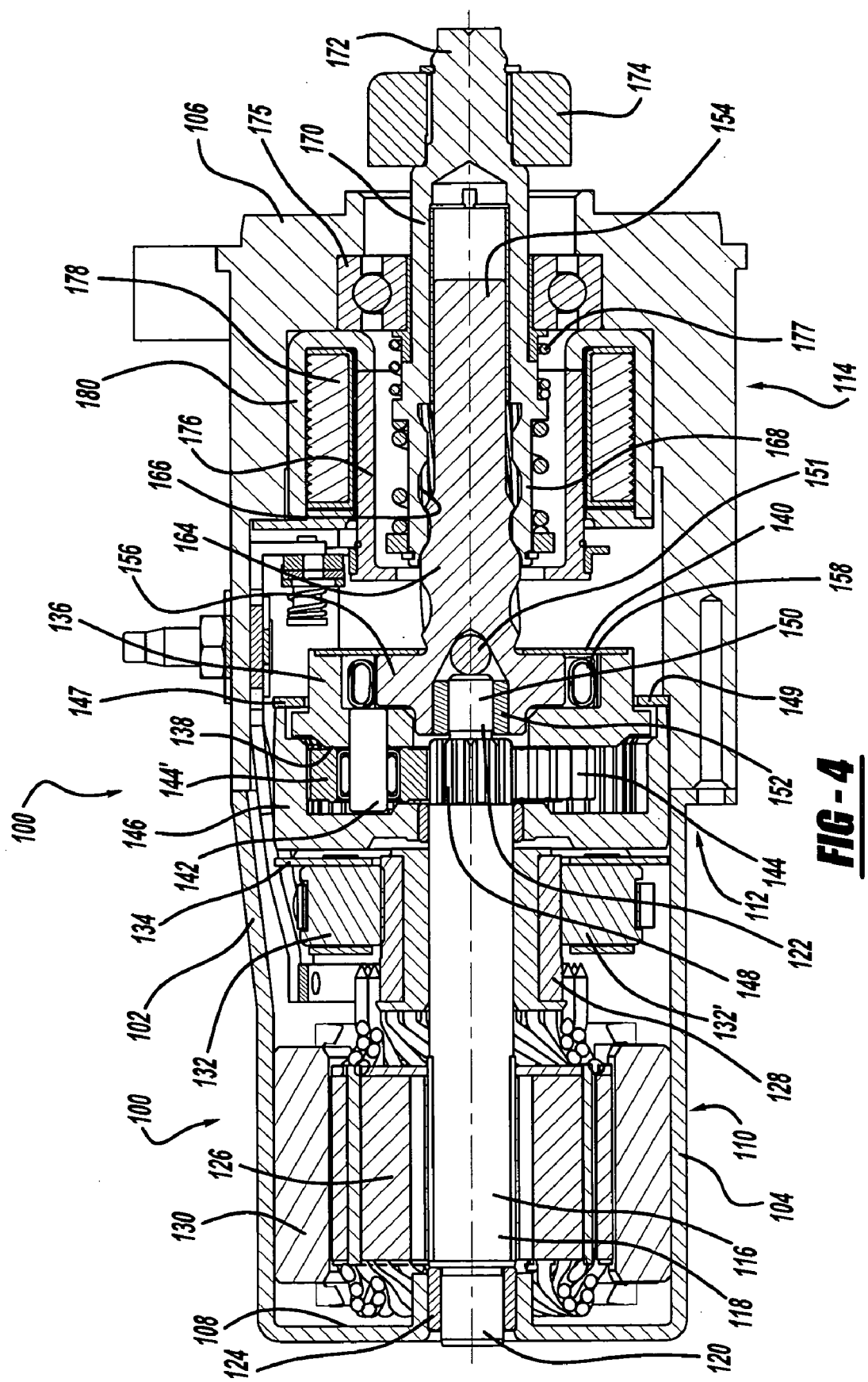
FIG. 4 is a longitudinal sectional view of the starter motor of the present invention similar to the view of FIG. 2 but illustrating the motor in the engaged position.

FIG. 4 illustrates the motor 100 in its engaged position in which the solenoid coil 178 has been energized via the ignition/starter switch (not shown), thus causing the solenoid plunger 176 to be drawn into the solenoid coil 178 against the force of a return spring 177. This position effects operative engagement of the pinion gear 174 with the ring gear (not shown). Engagement of the pinion gear 174 with the ring gear is assisted by a meshing spring 182 which is pre-loaded and provides a high pushing force to engage the pinion gear 174 with the ring gear. Electrical power is also sent to the motor portion 110, thus effecting rotation of the armature shaft 118. The shaft 118 drives the integrated gear support/clutch barrel 136 via the sun gear 148 and the planetary gears 144. The integrated gear support/barrel 136 drives the race 156 because of the friction that results between the integrated gear support/clutch barrel 136, the clutch rollers 160, 160' . . . , and the race 156. The output shaft 154 effects rotation of the pinion gear 174 via the carrier shaft 170.

Once the engine starts running, the revolutions of the race 156 exceed the revolutions of the integrated gear support/clutch barrel 136, and the rollers 160, 160' . . . are returned to their pre-engagement positions as is known in the art. This causes the epicycle gear train/one-way roller clutch assembly 112 to slip, thus leading to the breaking of the connection between the pinion gear 174 and the armature shaft 118. By breaking this rotational connection the armature shaft 118 is prevented from being rotated too fast, thus avoiding being damaged. The pinion gear 174 remains meshed with the ring gear as long as the solenoid coil 178 is energized. The solenoid plunger 176, the carrier shaft 170, and the pinion gear 174 are all returned to their initial positions by the return spring 177 once the solenoid coil 178 is de-energized.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A coaxial engine starter for starting an engine having a ring gear, comprising:
    an electric motor including an armature shaft;
    an output shaft coaxial with said armature shaft, said output shaft having a clutch end;
    a one-way clutch operatively coupled to said output shaft;
    an epicycle gear reduction assembly; and
    an integrated support and clutch barrel unit selectively driven by said armature of said electric motor, said integrated support and clutch barrel unit including a body, said body having a gear support side for supporting gearing members of said epicycle gear reduction assembly and a clutch side for housing members of said one-way clutch, said output shaft being operatively connected with said clutch side of said body;
    wherein said epicycle gear reduction assembly is fitted between and operatively connecting said armature shaft of said electric motor and said gear support side of said body, said reduction assembly being formed to reduce the rotation of said armature shaft, and wherein said one-way clutch is provided on said clutch side of said body to essentially control transmission of rotations between said armature shaft and said output shaft, said clutch end of said output shaft being operatively connected to said one-way clutch.

2. The coaxial engine starter of claim 1, wherein said armature shaft has a sun gear formed thereon.

3. The coaxial engine starter of claim 2, wherein said reduction assembly includes a plurality of planetary gears mounted on said gear support side of said body.

4. The coaxial engine starter of claim 3, wherein said starter includes a motor body and a stationary gear fitted to said motor body, said armature shaft having a sun gear formed thereon, said plurality of planetary gears being operatively disposed between said sun gear and said stationary gear for providing rotational speed reduction therebetween.

5. The coaxial engine starter of claim 4, further including a plurality of planetary gear shafts extending from said gear support side of said body.

6. The coaxial engine starter of claim 5, wherein said clutch side of said body is defined by an annular ring extending from said body.

7. The coaxial engine starter of claim 6, wherein said output shaft includes a clutch end, said clutch end being substantially rotatably positioned within said annular ring of said body.

8. The coaxial engine starter of claim 7, wherein said one-way clutch includes a plurality of rollers and a like plurality of biasing elements, said rollers and biasing elements being operatively positioned substantially between said annular ring of said body and said clutch end of said output shaft.

9. The coaxial engine starter of claim 8, wherein said armature shaft has a bearing end and said clutch end of said output shaft includes an armature bearing for rotatably receiving and supporting said bearing end of said armature shaft.

10. The coaxial engine starter of claim 9, further including a carrier shaft operatively mated to said output shaft and axially movable with respect thereto.

11. The coaxial engine starter of claim 10, further including a solenoid assembly composing a solenoid plunger operatively mated with said carrier shaft and a solenoid coil fixed to said motor body.

12. A coaxial engine starter for starting an engine having a ring gear, comprising:
    an electric motor including an armature shaft;
    an output shaft coaxial with said armature shaft:
    a one way clutch:
    an epicycle gear reduction assembly; and
    an integrated support and clutch barrel unit selectively driven by said armature of said electric motor, said integrated support end clutch barrel unit including a body, said body having a gear support side and a clutch side which on said gear support side supports gearing members of said epicycle gear reduction assembly and on said clutch side houses members of said one-way clutch, said output shaft being operatively connected with said clutch side of said body.

13. The coaxial engine starter of claim 12, wherein said epicycle gear reduction assembly is fitted between and operatively connecting said armature shaft of said electric motor and said gear support side of said body, said reduction assembly being formed to reduce the rotation of said armature shaft.

14. The coaxial engine starter of claim 13, wherein said armature shaft has a sun gear formed thereon and said reduction assembly includes a plurality of planetary gears mounted on said gear support side of said body.

15. The coaxial engine starter of claim 14, wherein said starter includes a motor body and a stationary gear fitted to said motor body, said armature shaft having a sun gear formed thereon, said plurality of planetary gears being operatively disposed between said sun gear and said stationary gear for providing rotational speed reduction therebetween.

16. The coaxial engine starter of claim 15, including a plurality of planetary gear shafts, said plurality of planetary gear shafts extending from said gear support side of said body, and wherein said one way clutch is provided on said clutch side of said body.

17. The coaxial engine starter of claim 16, wherein said clutch side of said body is defined by an annular ring extending from said body and wherein said output shaft includes a clutch end, said clutch end being substantially rotatably positioned within said annular ring of said body.

18. The coaxial engine starter of claim 17, wherein said one-way clutch includes a plurality of rollers and a like plurality of biasing elements, said rollers and biasing elements being operatively positioned substantially between said annular ring of said body and said clutch end of said output shaft.

19. The coaxial engine starter of claim 18, wherein said armature shaft has a bearing end and said clutch end of said output shaft includes an armature bearing for rotatably receiving and supporting said bearing end of said armature shaft.

20. The coaxial engine starter of claim 19, further including a carrier shaft and a solenoid assembly, said carrier shaft being operatively mated to said output shaft and axially movable with respect thereto and said solenoid assembly comprises a solenoid plunger operatively mated with said carrier shaft and a solenoid coil fixed to said motor body extending from said gear support side of said body.

* * * * *